United States Patent Office 3,342,896
Patented Sept. 19, 1967

3,342,896
CARBOXY-CONTAINING COPOLYMERS STABILIZED BY THE ESTERIFICATION OF THE CARBOXYL GROUPS WITH VINYL ETHERS OR OLEFINIC COMPOUNDS
Robert L. Zimmerman and Charles E. Lyons, Midland, Mich., assignors to The Dow Chemical Company, Midland, Mich., a corporation of Delaware
No Drawing. Filed Mar. 11, 1964, Ser. No. 351,213
14 Claims. (Cl. 260—837)

ABSTRACT OF THE DISCLOSURE

A carboxy containing copolymer is esterified with an olefin or an ether. The copolymer is then capable of reacting with a polyepoxide or an amine-aldehyde resin releasing the carboxyl groups in situ at elevated temperature.

This invention concerns compositions comprising carboxyl group-containing polymers and a curing agent.

Carboxyl group-containing polymers are useful in the production of hard, tough articles. In such uses, it is general practice to prepare a composition comprising a solution of the polymer in an organic solvent, a curing agent, and if desired, a catalyst to facilitate curing. The curing is usually accomplished at elevated temperatures. The compositions are particularly useful in coating applications but are unstable over the periods of time normally encountered in shipping and storage.

It has now been found that the stability of compositions comprising a carboxyl group-containing polymer and a curing, i.e. crosslinking, agent can be greatly increased by heating the polymer, preferably prior to formulation, in the presence of a vinylidene compound which is reactive with the carboxylic acid moieties of the polymer. This can be accomplished at relatively mild temperatures with a minimum of stirring and thus is readily adaptable to commercial operations.

The vinylidene, or ethylenically unsaturated compound that is employed in the present invention can be any one or more of those having the general formula

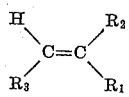

wherein $R_3$ is hydrogen; $R_2$ is hydrogen or alkyl; $R_1$ is alkoxy, cycloalkyl, cycloalkenyl, or an alkyl derivative thereof; wherein $R_1$ may be alkenyl or internal alkenyl when $R_2$ is alkyl; and wherein $R_1$ and $R_3$ together may form a furan or pyran ring when $R_2$ is hydrogen.

Cycloalkyl and cycloalkenyl herein refer to radicals having from 5 to 6 carbon atoms in the ring, and alkyl, alkoxy, and alkenyl herein refer to radicals containing not more than 5 carbon atoms. By the term "internal alkenyl" is meant those radicals which do not contain terminal unsaturation. Examples of vinylidene compounds that can be employed in accordance with the present invention include ethyl vinyl ether, butyl vinyl ether, isobutyl vinyl ether, isobutylene, diisobutylene, limonene, 2,3-dihydropyran, and 2,3-dihydrofuran.

Although the treatment of the carboxyl group-containing vinyl polymer with a vinylidene compound is highly effective in increasing the stability of compositions of the polymer and a curing agent, the treatment does not adversely affect, i.e. does not interfere with, the subsequent curing of the composition. Additional benefits and advantages afforded by the present invention include the provision of compositions having a lower viscosity. Thus lesser amounts of relatively expensive polar solvents can be used for the production of formulations, for example, adapted for coating as by spraying. Consequently, the invention permits economy of materials and of time required to drive off the solvent during curing operations.

The polymers that can be employed in accordance with the present invention are solid or resinous vinylidene polymers containing carboxyl or carboxylic acid groups distributed along the polymer chains. Advantageously, the polymer is a copolymer of an ethylenically unsaturated monomer with a carboxyl group-containing vinyl monomer.

The preferred ethylenically unsaturated monomers are those having the general formula

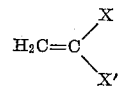

wherein X and X' are activating atoms or radicals selected from the group consisting of hydrogen atoms, halogen atoms, acetyl, carboxyalkyl, alkyl, substituted alkyl, alicyclic, substituted alicyclic, aromatic, and nuclear substituted aromatic radicals. Illustrative of such olefins are the compounds, for example, α-methylstyrene, vinyl acetate, alkyl($C_{1-3}$) acrylates, alkyl($C_{1-4}$) methacrylates, acrylonitrile, vinylnaphthalene, styrene, alkylstyrenes, and halogen-substituted styrenes in which from two to five of the nuclear hydrogen atoms are replaced by halogen and the like.

The carboxyl group-containing vinyl monomer used in preparing the copolymers that are preferably employed in the present invention can be any one or more of those that are capable of interpolymerization with an ethylenically unsaturated monomer. These monomers include α,β-unsaturated carboxylic acids such as acrylic or methacrylic acid; α,β-unsaturated dicarboxylic acids, such as maleic acid, fumaric acid, citraconic acid, glutaconic acid, itaconic acid or substitution products thereof, e.g. halogen, alkyl, and aryl derivatives; and monoesters of α,β-unsaturated dicarboxylic acids, such as ethyl acid maleate, isobutyl acid fumarate, and isooctyl acid maleate. The preferred form of the polymer ingredient in the invention is the copolymer of styrene with isooctyl acid maleate.

The copolymer of an ethylenically unsaturated monomer and a carboxyl group-containing vinyl monomer advantageously contains from 1 to 50 mole percent, preferably 5 to 25 mole percent, of the carboxyl containing vinyl monomer in chemically combined form, and is essentially homogeneous. Such copolymers are essentially gel-free, transparent, and have a substantially uniform composition in each polymer chain. In general, the best products or coatings are obtained when employing those compositions of the invention wherein the polymer has not more than 0.2 equivalent carboxyl groups per 100 grams of the polymer.

In a preferred method of practicing the present invention, a solution of about 50% by weight of a carboxyl group-containing polymer in an organic solvent is provided. To this solution is added a vinylidene compound as hereinbefore described, preferably in an amount to provide from 1 to 2 molar equivalents for each equivalent carboxyl group of the polymer. A trace of acid catalyst is added. Best results are obtained with an organic acid catalyst when the reagent is a vinyl ether and with a mineral acid catalyst in all other cases. This mixture is then heated at a temperature of about 60° C. for a time of at least 6 hours or until the substantial disappearance of carboxylic acid groups as determined by infrared analysis. However, the heating can be conducted at any temperature within the range of from 50 to 150° C., the time required varying depending on the particular temperature employed. At temperatures of about 150° C. a time of at least 30 minutes is desirable. To the resulting product is added a curing agent, and if desired, a catalyst. The curing agent can be any polyfunctional compound capable of crosslinking via the carboxyl groups of the polymer which become available when the compositions are heated to temperatures normally employed to effect curing. However, the curing agent advantageously is a polyepoxide, e.g., D.E.R. 332 (registered trademark) epoxy resin, or an alcoholized amine-formaldehyde resin, e.g. butylated malamine-formaldehyde or mixtures of these reagents. When employing both a polyepoxide and an alcoholized amine-formaldehyde resin, the latter can serve as a catalyst, as co-reactant, or as both catalyst and co-reactant. Suitable catalysts that can be employed to aid in the curing process include amines such as tri(butoxymethyl)melamine.

Coatings based on the resins described herein have been found to be useful in a wide range of applications, for example, primers and topcoats on steel, coating for aluminum in exterior applications, and as a coating for wood.

Hard, solvent-resistant, clear films are obtained from the herein-described compositions on baking at temperatures as low as 100° C. However, the best curing and film characteristics are obtained on baking at a temperature of about 175° C. for at least 10 minutes.

The invention is further illustrated by the following examples.

Example 1

To three 37.5 g. aliquots of a copolymer solution of 86.8 mole percent styrene and 13.2 mole percent isooctyl acid maleate (50% by weight in xylene; 0.022 equiv. polymeric carboxyl per 37.5 g. resin solution) was individually added one of the following reagents:

|   |   | G. |
|---|---|---|
| (a) Ethyl vinyl ether | | [1] 3.2 |
| (b) n-Butyl vinyl ether | | [1] 4.4 |
| (c) Iso-butyl vinyl ether | | [1] 4.4 |

[1] 0.044 equiv.

These aliquots were reduced with a blend of Cellosolve acetate and S.C. 150 (registered trademark for mixed alkyl benzene, B. about 200° C.) to a viscosity that permitted convenient mixing but was above conventional spray viscosity. A trace of benzoic acid was added, and the aliquots heated at about 60° C. for 48 hours.

At the end of this period the reacted mixtures were subjected to infrared analysis. A thin film of each mixture was spread on NaCl prisms and heated 60° C. for 15 minutes to drive off the solvents. Each film exhibited a similar spectrum in the infrared carbonyl region. There was a weak absorption at 5.65μ from polymeric maleic anhydride and a strong ester absorption at 5.80μ with a moderate strength upfield shoulder from unesterified carboxyl. This indicated that substantial esterification had occurred since the unreacted polymer exhibits clearly separated ester and carboxyl peaks of approximately equal intensity in this absorption region.

The same films were then heated at about 175° C. for 30 minutes and again examined by infrared. Again, each film gave a similar absorption pattern in the carbonyl region: 5.45 and 5.65μ (maleic anhydride; 5.80μ (ester); and 5.88μ (carboxyl). The latter two absorption bands were clearly separated and of almost equal intensity, resembling the unreacted polymer in this respect.

The above mixtures were then formulated as follows: to each was added D.E.R. 332 epoxy resin in the amount of one epoxy grouping per polymeric carboxyl grouping, and tri(butoxymethyl) melamine (catalyst and co-reactant) in the amount of one butoxy equivalent per polymeric carboxyl grouping. Rutile TiO₂ was added in an amount equal to the weight of non-volatile vehicle solids. The formulations were then milled overnight.

To test relative curing of the three mixtures against a control without blocked carbonyl, the four formulations were cast on Bonderized steel test panels and baked at 175° C. for 30 minutes. Immediately after cooling to room temperature, an area on each panel was vigorously rubbed with a xylene-saturated paper tissue. After 50 strokes, all panels appeared equal with respect to film rub-off—only a very small amount of coating could be rubbed off in the test.

The above four formulations were then put into tightly stoppered bottles and aged at 60° C. These were briefly hand shaken daily and observed until a given mixture thickened to a point judged to be beyond that at which it could be reduced and sprayed. In each case this thickening was soon followed by gelation.

Following are 60° C. shelf lives:

|   | Days |
|---|---|
| Control | 33 |
| Formulation treated with ethyl vinyl ether | 99 |
| Formulation treated with n-butyl vinyl ether | >116 |
| Formulation treated with isobutyl vinyl ether | >116 |

Example 2

To three 30.0 g. aliquots of a copolymer solution of n-butyl acrylate/methyl methacrylate/acrylic acid, 50/40/10 weight percent (52% by weight in 80% xylene and 20% butanol; 0.022 equiv. polymeric carboxyl per 30.0 g. resin solution), was individually added one of the following reagents:

|   |   | G. |
|---|---|---|
| (a) Ethyl vinyl ether | | [1] 3.2 |
| (b) n-Butyl vinyl ether | | [1] 4.4 |
| (c) Iso-butyl vinyl ether | | [1] 4.4 |

[1] 0.044 equiv.

A trace of benzoic acid was added to each sample, and the aliquots heated at 60° C. for 48 hours.

At the end of this period, they were formulated with D.E.R. 332 epoxy resin in the amount of one equivalent epoxy group per carboxyl grouping; tri(butoxymethyl) melamine in the amount of one butoxy equivalent per carboxy grouping; and rutile TiO₂ in an amount equal to the weight of non-volatile resin solids. The formulations were milled overnight and then cast onto Bonderized steel test panels and subjected to 50-rub xylene-paper tissue tests as in Example 1. The three mixtures and a control exhibited equal cure in this test.

The four mixtures above were then put into tightly stoppered bottles and allowed to stand at 60° C. to test shelf life. They were shaken daily and observed until marked thickening set in. Following are the 60° C. shelf lives:

|   | Days |
|---|---|
| Control | 3 |
| Formulation treated with n-butyl vinyl ether | 6 |
| Formulation treated with ethyl vinyl ether | 7 |
| Formulation treated with isobutyl vinyl ether | 8 |

Example 3

To three 37.5 g. aliquots of a copolymer solution of 86.8 mole percent styrene and 13.2 mole percent isooctyl acid maleate (the same resin solution used in Example 1) was added the following reagents:

|   |   | G. |
|---|---|---|
| (a) Isobutylene | | [1] 2.6 |
| (b) Diisobutylene | | [1] 5.2 |
| (c) Dihydropyran | | [1] 3.7 |
| (d) Limonene | | [1] 6.0 |

[1] 0.044 equiv.

The aliquots were reduced to a more convenient viscosity by the addition of a blend of Cellosolve acetate and S.C. 150 (registered traemark). A trace of concentrated sulfuric acid was added as catalyst to each of the above and the mixtures heated at 60° C. for 48 hours.

Infrared analyses of thin clear films from each of the above showed results similar to those described in Example 1 in the case of diisobutylene and limonene. In the case of isobutylene and dihydropyran, the treated material, after heating shows marked increase in infrared anhydride absorption simultaneous with diminution of the strong ester peak and the acid shoulder.

The above mixtures and a control were formulated and milled with D.E.R. 332 epoxy resin, tri(butoxymethyl)-melamine, and rutile $TiO_2$ as in Example 1. Cast films on Bonderized steel panels baked at 175° C. for 30 minutes gave xylene-paper tissue 50-rub tests indicating cure equal to that of the control.

Shelf life tests at 60° C. were conducted in a manner similar to that of Example 1. The following results were obtained.

|  | Days |
|---|---|
| Control | 27 |
| Formulation treated with dihydropyran | 38 |
| Formulation treated with isobutylene | >64 |
| Formulation treated with limonene | 45 |
| Formulation treated with diisobutylene | >66 |

Films from the stabilized compositions of the present invention are less subject to sagging and solvent bleeding than are those from unstabilized compositions.

We claim:
1. A stabilized composition comprising (a) a polymer containing 1–50 mole percent of a carboxyl containing vinyl monomer and (b) a curing agent selected from the group consisting of a polyepoxide having more than one 1,2-epoxy group per molecule, an amine- aldehyde resin and a mixture thereof, which is reactive with the carboxyl groups of the polymer, wherein the polymer has been heated in the presence of a vinylidene compound selected from the group having the general formula

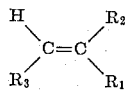

wherein $R_3$ is hydrogen; $R_2$ is a member selected from the group consisting of hydrogen and alkyl; $R_1$ is a radical selected from the group consisting of cycloalkyl and cycloalkenyl having from 5 to 6 only carbon atoms in the ring and alkyl derivatives thereof, and alkoxy; wherein $R_1$ may be a radical selected from the group consisting of alkyl and internal alkenyl when $R_2$ is alkyl; and wherein $R_1$ together with $R_3$ may form a ring selected from the group consisting of furan and pyran rings when $R_2$ is hydrogen; said alkyl, alkenyl, and alkoxy radicals each containing not more than 5 carbon atoms until substantial esterification has occurred.

2. Composition of claim 1, wherein the carboxyl group-containing polymer is a copolymer of a major molar proportion of an ethylenically unsaturated monomer with a minor molar proportion of a carboxyl group-containing vinyl monomer.

3. Composition of claim 2, wherein the carboxyl group-containing polymer contains not more than 0.2 equivalent carboxyl group per 100 g. of the polymer.

4. Composition of claim 3, wherein the curing agent is a polyepoxide.

5. Composition of claim 4, wherein the carboxyl group-containing polymer contains styrene in chemically combined form.

6. Composition of claim 4, wherein the carboxyl group-containing polymer contains isooctyl acid maleate in chemically combined form.

7. Composition of claim 2, wherein the carboxyl group-containing polymer is a copolymer of acrylic acid and one or more members selected from the group consisting of alkyl acrylates, said alkyl containing from 1 to 8 carbon atoms, and alkyl methacrylates, said alkyl containing from 1 to 4 carbon atoms.

8. Composition of claim 1, wherein the carboxyl group-containing polymer is a copolymer of about 50% by weight n-butyl acrylate, about 40% by weight methyl methacrylate, and about 10% by weight acrylic acid.

9. A film which consists essentially of the stabilized composition of claim 1.

10. Articles coated with a stabilized composition of claim 1.

11. Method for stabilizing polymers containing 1–50 mole percent of carboxyl containing vinyl monomers to the presence of a curing or crosslinking agent selected from the group consisting of a polyepoxide having more than one 1,2-epoxy groups per molecule, an amine-aldehyde resin and a mixture thereof therefor at ambient temperatures which comprises heating the carboxyl group-containing polymer in the presence of a vinylidene compound selected from the group having the formula

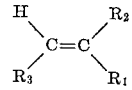

wherein $R_3$ is hydrogen; $R_2$ is a member selected from the group consisting of hydrogen and alkyl; $R_1$ is a radical selected from the group consisting of cycloalkyl and cycloalkenyl having from 5 to 6 only carbon atoms in the ring and alkyl derivatives thereof, and alkoxy; wherein $R_1$ may be a radical selected from the group consisting of alkyl and internal alkenyl when $R_2$ is alkyl; and wherein $R_1$ together with $R_3$ may form a ring selected from the group consisting of furan and pyran rings when $R_2$ is hydrogen; said alkyl, alkenyl, and alkoxy radicals each containing not more than 5 carbon atoms until substantial esterification has occurred.

12. The method of claim 11, wherein the vinylidene compound is employed in an amount of from 1 to 2 molar equivalents for each equivalent carboxyl group of the polymer.

13. The method of claim 10, wherein the heating is conducted at a temperature within the range of from 50° C. to 150° C.

14. Composition of claim 1, wherein the vinylidene compound is a member selected from the group consisting of ethyl vinyl ether, butyl vinyl ether, isobutyl vinyl ether, isobutylene, diisobutylene, limonene, 2,3-dihydropyran and 2,3-dihydrofuran.

References Cited

FOREIGN PATENTS 1,313,575  11/1962  France.

SAMUEL H. BLECH, *Primary Examiner.*

MURRAY TILLMAN, *Examiner.*

P. LIEBERMAN, *Assistant Examiner.*